(12) United States Patent  
Padgett

(10) Patent No.: US 12,037,727 B2  
(45) Date of Patent: Jul. 16, 2024

(54) VARIABLE DENSITY TUFTING PATTERNS

(71) Applicant: Tuftco Corporation, Chattanooga, TN (US)

(72) Inventor: Robert A. Padgett, Chattanooga, TN (US)

(73) Assignee: Tuftco Corporation, Chattanooga, TN (US)

( * ) Notice: Subject to any disclaimer, the term of this patent is extended or adjusted under 35 U.S.C. 154(b) by 68 days.

(21) Appl. No.: 17/782,165

(22) PCT Filed: Dec. 2, 2020

(86) PCT No.: PCT/US2020/070842  
§ 371 (c)(1),  
(2) Date: Jun. 2, 2022

(87) PCT Pub. No.: WO2021/113865  
PCT Pub. Date: Jun. 10, 2021

(65) Prior Publication Data  
US 2023/0010926 A1    Jan. 12, 2023

Related U.S. Application Data

(60) Provisional application No. 62/942,639, filed on Dec. 2, 2019.

(51) Int. Cl.  
D05C 15/34    (2006.01)  
D05C 15/10    (2006.01)  
D05C 15/18    (2006.01)  
G05B 19/4155   (2006.01)

(52) U.S. Cl.  
CPC ............ *D05C 15/34* (2013.01); *D05C 15/10* (2013.01); *D05C 15/18* (2013.01); *G05B 19/4155* (2013.01); *D05D 2205/02* (2013.01); *G05B 2219/45196* (2013.01)

(58) Field of Classification Search  
CPC ........ D05C 15/34; D05C 15/10; D05C 15/18; D05C 15/04; D05C 15/08; D05C 15/26; D05C 15/28; D05C 15/30; G05B 2219/45196  
See application file for complete search history.

(56) References Cited

U.S. PATENT DOCUMENTS

| | | |
|---|---|---|
| 3,103,187 A | 9/1963 | Hammel |
| 4,549,496 A | 10/1985 | Kile |
| 5,143,003 A | 9/1992 | Dedmon |
| 5,382,723 A | 1/1995 | Durual |
| 5,738,030 A | 4/1998 | Ok |
| 6,439,141 B2 | 8/2002 | Morgante |
| 7,426,895 B2 | 9/2008 | Smith |
| 8,240,263 B1* | 8/2012 | Frost ............... D05C 15/30 112/475.23 |
| 8,359,989 B2 | 1/2013 | Hall |
| 9,051,672 B2* | 6/2015 | Bearden ........... D05C 15/30 |

(Continued)

FOREIGN PATENT DOCUMENTS

| | | |
|---|---|---|
| WO | WO 2018/236411 | 12/2018 |
| WO | WO 2019/140349 | 7/2019 |

*Primary Examiner* — Danny Worrell  
(74) *Attorney, Agent, or Firm* — Miller & Martin PLLC

(57) ABSTRACT

A method is provided for the design and manufacture of tufted patterned textiles having selected yarn densities that may vary for different pattern palette colors and in different areas of a pattern.

17 Claims, 17 Drawing Sheets

(56) References Cited

U.S. PATENT DOCUMENTS

| | | | |
|---|---|---|---|
| 9,399,832 B2 * | 7/2016 | Hall | D05C 15/18 |
| 9,556,548 B2 * | 1/2017 | Frost | D05C 15/34 |
| 9,915,017 B2 | 3/2018 | Padgett | |
| 10,954,617 B2 * | 3/2021 | Marijsse | D05C 15/26 |
| 2009/0205547 A1 * | 8/2009 | Hall | D05C 15/36 |
| | | | 112/80.41 |
| 2009/0260554 A1 * | 10/2009 | Hall | D05C 11/00 |
| | | | 112/80.4 |

* cited by examiner

VARIABLE DENSITY TUFTING PATTERNS

The present invention is a national filing claiming priority to PCT/US2020/070842 filed Dec. 2, 2020 which in turn claims priority to U.S. Provisional Application Ser. No. 62/942,639 filed Dec. 2, 2019.

FIELD OF THE INVENTION

The invention relates to a manufacture of patterned textiles, and more particularly the design and manufacture of tufted patterned textiles having selected yarn densities that may vary in different areas of a pattern.

BACKGROUND OF THE INVENTION

In the manufacture of patterned textiles, and particularly in the manufacture of tufted textile products, designs are created for fabrics in a pixel-mapped format where each pixel in a graphic representation corresponds to a separate tuft or bight of yarn that is displayed on the surface of the tufted carpet. Pixel-mapped designs became prevalent as a result of the evolution of tufting machines to possess the capability of placing a particular color of yarn at virtually any location in a given pattern. In the field of broadloom tufting machines, this capability was present in the mid to late 1990s with computer controlled needle bar shifters, servo motor driven backing feeds, and servo motor driven yarn feed pattern controls. However, even decades earlier simple patterns could be tufted in a similar fashion as typified by Hammel, U.S. Pat. No. 3,103,187 using photoelectric cells to read instructions for actuation of electromagnetic clutch operated yarn feeds.

Other types of tufting machines such as hollow needle machines manufactured by Tapistron, or the iTron machines manufactured by Tuftco Corp. have the ability to place any color of yarn in any location of the backing fabric. Independent control needle ("ICN") machines typified by Cobble's ColorTec machines, also could place any color yarn at any position on backing fabric from about 1994.

Tufted textile fabrics may be manufactured from a single color of yarn threaded in all the needles of a tufting machine. However, in commercial and hospitality markets, it is much more common that patterns will have between about three to six colors of yarn, and in some cases, even more. When using multiple colors of yarn in a pattern, there are many possible variations in appearance and carpet structure. Indeed, not only do the colors of the yarn create particular appearance, but cut yarn bights may create a different appearance than loop yarn bights of the same yarn, yarns may have different material composition, thickness, weights (or denier), and twists of fibers, the stitch rate utilized in tufting backing may be modified in different patterns by utilizing different machines or variable gauge tufting as with hollow needle machines and/or precision backing shifting, and different height yarn bights of many distinctions in texture and visual appearance can be realized.

The production of completed tufted textiles generally involves several distinct steps. First is the selection or creation of a pattern. Second is the tufting of a fabric by placing the yarns in a backing fabric according to the pattern. Finally, there are finishing steps to remove irregularities, to lock the tufted yarns in place with the application of a secondary backing, and to trim any uneven margins as the fabric is cut to size.

The creation of tufted fabric involves feeding yarns to needles on a tufting machine, and reciprocating the needles to insert the yarns through the backing fabric. By controlling operations such as the shifting of needles and backing fabric, the feeding of the backing fabric, the amounts of yarn fed to specific needles, the types of knives and gauge parts operating to seize or cut yarns carried through the backing fabric, and in the case of ICN tufting machines, the selection of needles to penetrate the backing fabric, almost any design can be created on a properly configured and threaded tufting machine.

It can be seen that the inputs necessary to create the tufted fabric include labor, yarn, backing fabric and the typically multi-million dollar investment in a tufting machine and yarn creel. Such tufting machines, while built on a chassis not unlike those from the last century, now include sophisticated electronics and software in addition to the many precision reciprocating and electronically driven parts that operate to move the yarns and backing as required.

With the evolution of tufting machines, the possibilities for patterns have evolved from solids, textures, geometrics, repeated graphics, and copies of woven textiles, to encompass nearly photographic representations of a wide range of images. Furthermore, patterns may now be over 1000 positions in both width and length, leading to designs with over a million individual pixel-mapped positions.

Since a tufting machine is a sizable fixed investment that should justify its cost over several years of production, the opportunities to minimize the overall cost of creating tufted fabrics must focus on the labor and materials consumed in that production. Labor is involved in creating designs and in configuring tufting machines for each individual pattern to be run, especially the threading of yarns to the individual needles and positioning of yarn cones in a yarn creel or the winding of beams to feed the yarns to the needles.

In commonly owned U.S. Pat. No. 9,915,017, an invention is directed to reducing wasted yarn when patterns do not utilize similar amounts of colors of yarn fed to needles across the width of the tufting machine. Apart from the results described in this patent, it has also proved desirable to modify patterns to alter the density of stitches and the weight of yarn placed in the backing fabric. Heretofore, the general techniques to add small amounts of weight to a backing fabric would include increasing the stitch rate of the tufting machine slightly so that bights of yarn would be placed slightly closer together or tufting bights of yarn to a slightly greater height in the backing material. Conversely, to slightly reduce weight in a tufted fabric the stitch rate could be decreased so that were fewer longitudinal stitches and the height of the yarn bights could be slightly reduced. In addition, when it was desired to vary the appearance of yarns, they could be tufted at double density or half density in a variety of ways, for instance, on double needle bar machines, the use of one needle bar having ¼th inch needle spacing gauge ($¼^{th}$ gauge) and a second needle bar having ⅛th inch needle spacing gauge ($⅛^{th}$ gauge). In this fashion, yarns tufted by the $¼^{th}$ gauge needle bar would have half the density of yarns tufted by the $⅛^{th}$ gauge needle bar within the same pattern. Similarly, in a hollow needle tufting machine it has sometimes been possible to feed two yarns through a single hollow needle on the same stitch resulting in a double density face carpet relative to the number of penetrations.

Simply being able to halve or double stitch densities is of limited usefulness, however. Accordingly, there has been a desire to provide more subtle variations in yarn bight densities to achieve different visual and textural effects and to provide additional techniques to alter the weight of tufted fabrics.

SUMMARY OF THE INVENTION

Since heretofore it has been impractical to adjust stitch densities on a yarn by yarn basis instead of across an entire width of a tufting machine, it is desirable to utilize software to allow for the specification of yarn densities both on a per pattern color basis for use by designers and also according to zones of carpet tufting for use by cost planning and design professionals. To provide these features, design software can be operated to specify yarn feed rates and apparent gauge of stitching for each pattern color. In addition, a variety of computed or preconfigured overlays for the removal of specified numbers, percentages, or templates of stitches is provided. Particularly with the case of stitch removal in particular regions of a carpet based upon stitch density considerations rather than the appearance of a particular color or style of yarn, it is often preferred to utilize randomization algorithms to create the values used for stitch reduction. When suitably applied, the patterning tools can both create novel textures and appearances and optimize the weight of yarns carried by a backing fabric.

BRIEF DESCRIPTION OF THE DRAWINGS

The particular features and advantages of the invention as well as other objects will become apparent from the following description taken in connection with the accompanying drawings in which:

FIG. 9 is an exemplary control screen display for the input of needle bar (and/or backing) shift profiles;

FIGS. 11A through 11D graphically illustrate the creation of a map for the removal of stitches to reduce stitch density.

DETAILED DESCRIPTION OF THE INVENTION

Figure 1A:
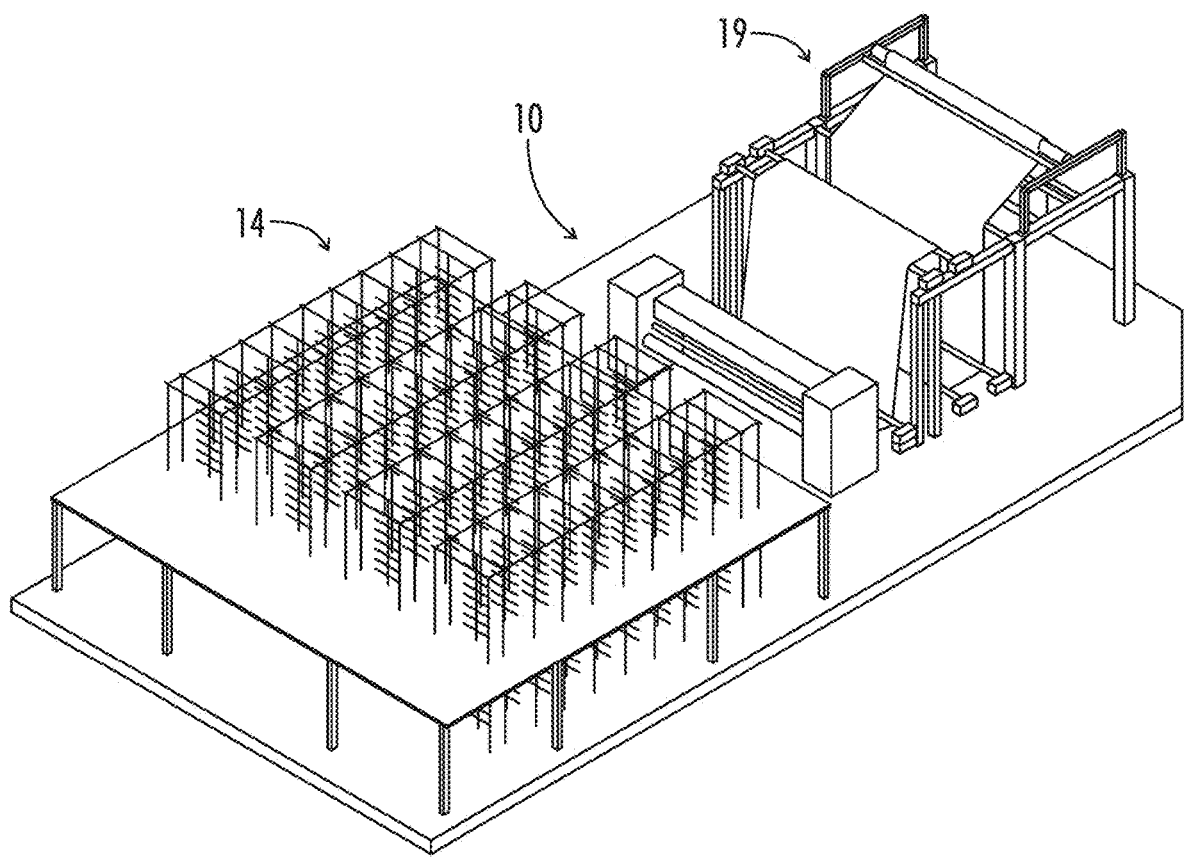
FIG. 1A is a perspective view of a general prior art tufting machine and creel.

Turning then to FIG. 1A, a general depiction of the tufting machine 10 with take up rolls 19 for the tufted fabric and two story creel 14 to hold cones of yarn is illustrated. It should be understood that the invention can be practiced on a wide variety of tufting machines, not simply the broadloom machine 10 depicted in FIG. 1A. For instance, ColorTec ICN machines and iTron hollow needle tufting machines also have the capability to place yarns in individual pixel locations according to a pattern and thus are suitably adapted to utilize with the invention. In addition, the yarn creel set up is exemplary and yarns could be supplied to the tufting machine from a single story creel or from beams that are wound for use in supplying yarns. In the typical case there will be hundreds of separate yarns fed from the creel, most frequently between about 600 and 1800 yarns and most commonly between about 1100 and 1700 yarns, although some machine and pattern combinations, such as relatively narrow hollow needle machines tufting patterns with a limited number of colors, could operate with a smaller number.

Figure 1B:
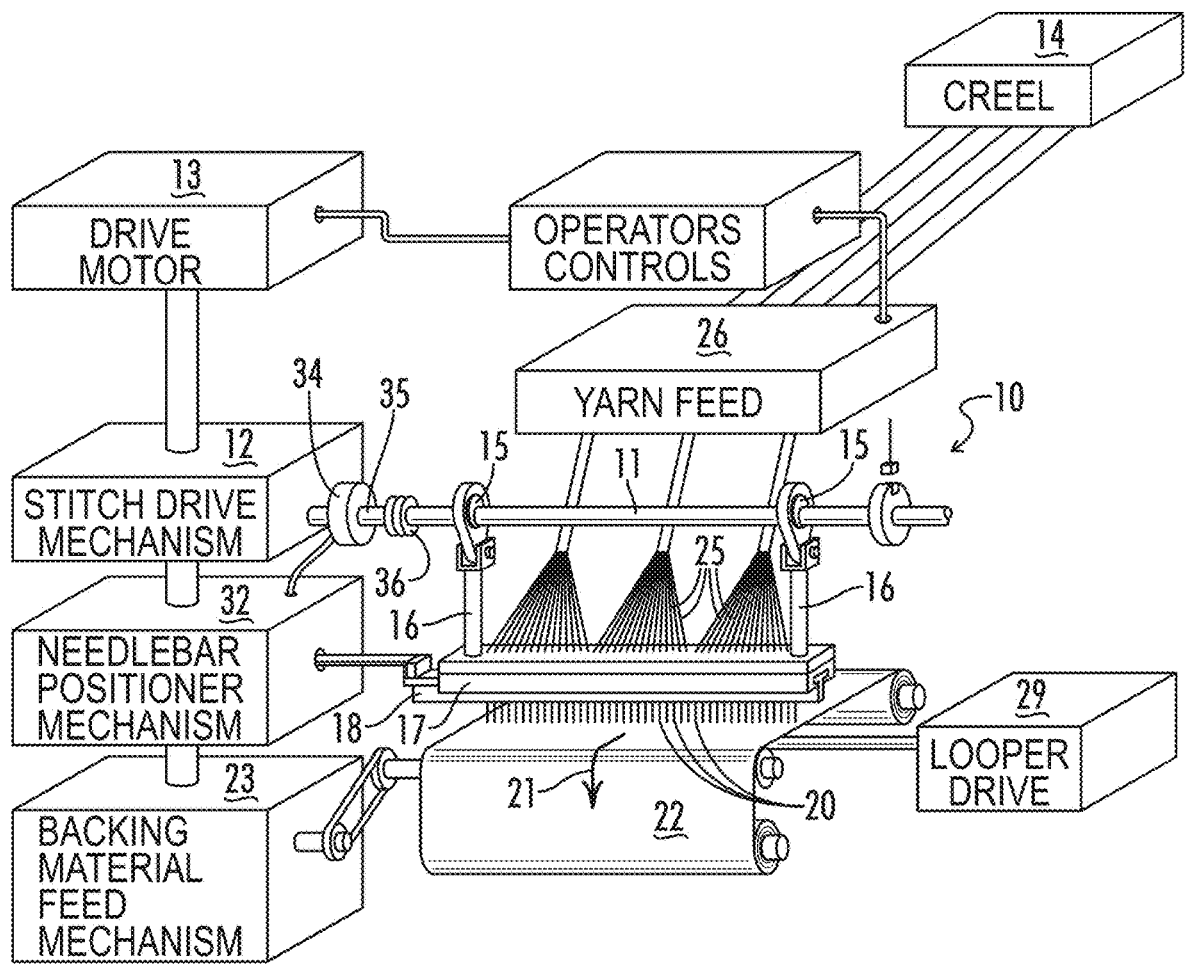
FIG. 1B is a schematic view of a prior art tufting machine in greater detail.

The tufting machine 10 disclosed in FIG. 1B includes a rotary needle shaft or main drive shaft 11 driven by stitch drive mechanism 12 from a drive motor or other conventional means. Rotary eccentric mechanism 15 mounted upon rotary needle shaft 11 is adapted to reciprocally move the vertical push rod 16 for vertically and reciprocally moving the needle bar slide holder 17 and needle bar 18. The needle bar 18 supports a plurality of uniformly spaced tufting needles 20 in a longitudinal row, or staggered longitudinal rows, extending transversally of the feeding direction of the backing fabric or material 22. The backing fabric 22 is moved longitudinally in direction 21 through the tufting machine 10 by the backing fabric feed mechanism 23 and across a backing fabric support with needle plate and needle plate fingers.

Yarns 25 are fed from the creel 14 to the pattern control yarn feed 26 to the respective needles 20. As each needle 20 carries a yarn 25 through the backing fabric 22, a hook or looper is reciprocally driven by the looper drive 29 to cross each corresponding needle 20 and hold the corresponding yarn end 25 to form loops. Cut pile tufts are formed by cutting the loops with knives.

The needle bar shifting apparatus 32 is designed to laterally or transversely shift the needle bar 18 relative to the needle bar holder 17 a predetermined transverse distance equal to the needle gauge or multiple of the needle gauge, and in either transverse direction from its normal central position, relative to the backing fabric 22, and for each stroke of the needles 20. Alternatively, a precision backing shifter may be employed and lateral shifting may be undertaken at a variable gauge as described in PCT/US2017/054683 and PCT/US2019/013412.

In order to generate input encoder signals for the needle bar shifting apparatus 32 corresponding to each stroke of the needles 20, an encoder 34 may be mounted upon a stub shaft 35, or in another suitable location, and communicate positional information from which the tufting machine controller can determine the position of the needles in the tufting cycle. Alternatively, drive motors may use commutators to indicate the motor positions from which the positions of the associated driven components may be extrapolated by the controller. Operator controls 24 also interface with the tufting machine controller to provide appropriate instructions and pattern information.

On a broadloom tufting machine, these components can be operated in a fashion to provide pixel-addressed yarn placement as described in various prior patents such as U.S. Pat. Nos. 6,439,141; 7,426,895; and 8,359,989 and continuations thereof. Pixel controlled yarn placement in connection with ICN machines is described in U.S. Pat. Nos. 5,382,723 and 5,143,003; while pixel controlled placement of yarns utilizing hollow needle tufting machines is described in U.S. Pat. Nos. 4,549,496 and 5,738,030. Variable lateral shifting is described in PCT/US2017/054683 and PCT/US2019/013412. All these patents are incorporated herein by reference.

Figure 2:
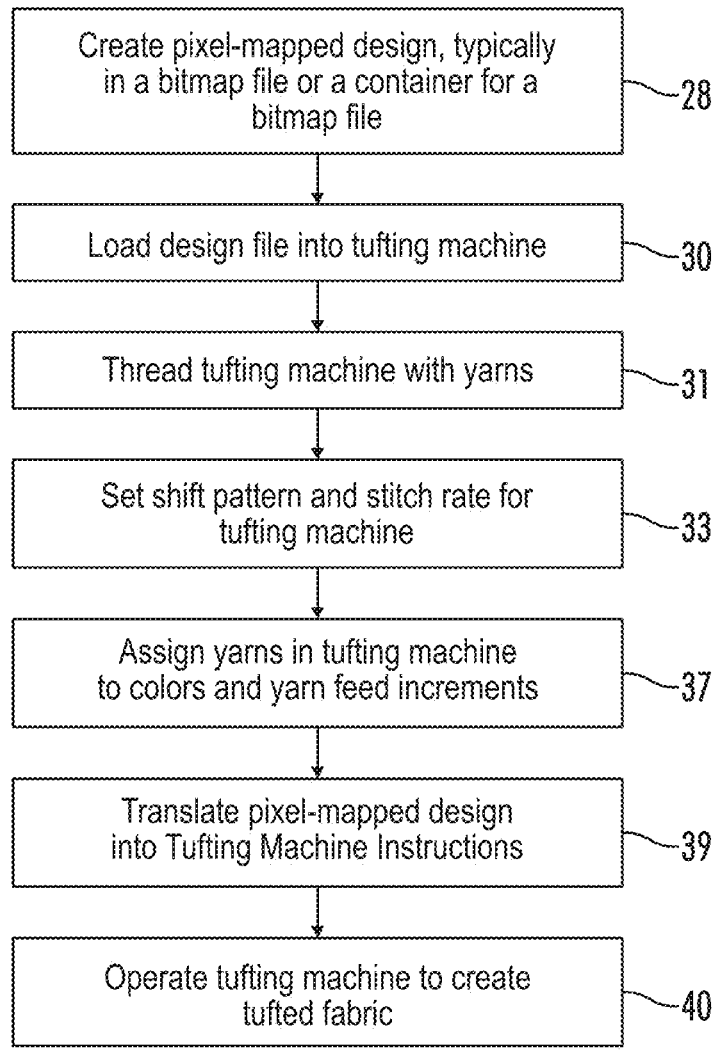
FIG. 2 is a flow diagram illustrating exemplary steps presently and previously used in designing and manufacturing tufted fabric.

Turning then to the process of designing and manufacturing tufted fabric as reflected in FIG. 2, the first step 28 is the creation of a graphic design to be tufted. The design can be created by an artist or adapted from a photograph or preexisting image. In either case, the image should be created or processed to limit the color palette to a manageable number of yarn colors, preferably between two and twelve, and most commonly three to six yarn colors, though six to ten pattern palette colors are relatively common in commercial and hospitality carpet designs.

The next step 30 is to load the image into a tufting machine having a controller running a control software system such as the Tuftworks system sold by Tuftco Corp. and to process the pattern graphics to create machine instructions. The tufting machine should be threaded with appropriate yarns 31. When using the Tuftworks system, there are several steps prior to creating machine instructions. One step 33, carried out as reflected in FIG. 2 is to assign a stitch rate and shift profile to the pattern.

Yarns are assigned to a threadup sequence 37, usually two yarns as an AB alternating sequence, three yarns as an ABC sequence, and four yarns as an ABCD sequence. Some variations are possible with tufting machines having two needlebars, such as an AB yarn sequence on one needlebar and a CD yarn sequence on the other needlebar. Then the pattern palette is associated with the yarns. The pattern palette colors may correspond to particular yarn colors (or styles), however a particular color of yarn in the threadup may be tufted at different heights or selectively cut and thereby be associated with more than one pattern palette color. The pixel-mapped design is then translated into tufting machine instructions 39, and the tufting machine is operated to produce the desired fabric 40.

Figure 3:
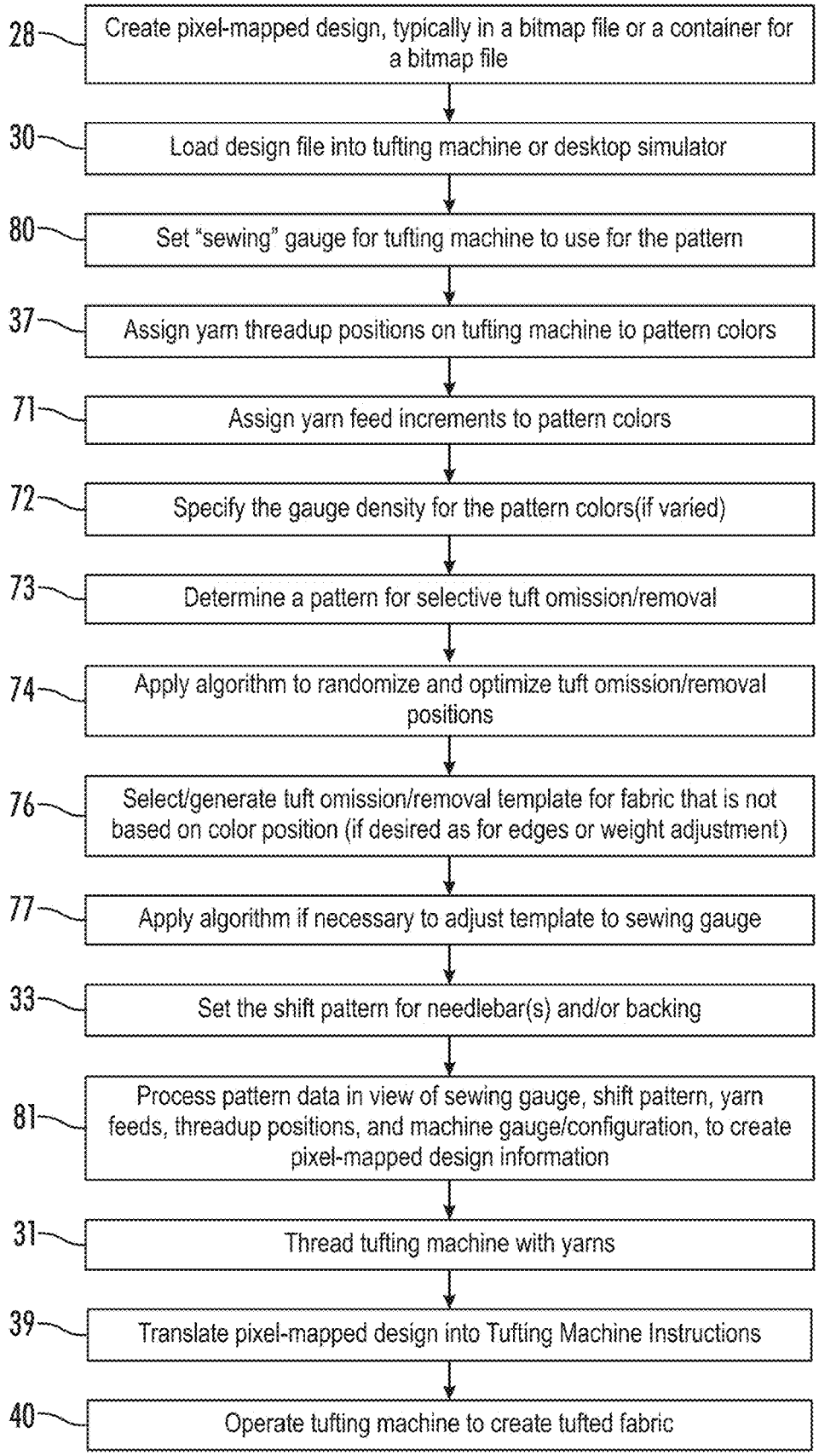
FIG. 3 is a flow diagram of exemplary steps in practicing variable yarn density methods in connection with designing patterns to manufacturing tufted fabrics.

A revised procedure for applying variable density within a tufted pattern is set forth in FIG. 3. While the steps of creating a pixel mapped design 28, loading a design file 30, threading a tufting machine with yarns 31, setting a shift pattern 33, assigning yarns and yarn feed increments to pattern pallet colors 37,71, translating the pixel mapped design 39 and operating the tufting machine 40 are very nearly equivalent steps, there are additional procedures undertaken to create one or more varied densities within the tufted fabric. Specifically, the gauge at which the fabric is sewn 80 is set, but this may differ from the gauge density for pattern pallet colors and may differ from the regular or maximum gauge density in overlay areas 76. As a result, after the pixel mapped design is loaded into a tufting machine or desktop simulator 30, a sewing gauge is set for the pattern 80. The sewing gauge will typically be the densest area of yarn bights within the fabric pattern. As a general practice, densities are set based upon a "square" positioning of stitches so that a one inch square of $1/12^{th}$ gauge fabric will have twelve stitches longitudinally and twelve stitches laterally. However, there is no reason that in appropriate circumstances these dimensions might be varied and a fabric might, for instance, have twelve stitches laterally and only ten stitches longitudinally or vice versa.

When multiple colors of yarn are used in a longitudinal row of needles with only a single yarn threaded through each needle, it may be necessary to make multiple penetrations to achieve the equivalent density. For A, B, and C yarns threaded in sequence on an eighth gauge needlebar, it is necessary to shift the needles relative to the backing fabric and make three times as many penetrations as would be the case for a needlebar threaded with only one color of yarn. As a result, to create a $1/8$th gauge square density of the A yarns, using an eighth gauge needlebar, it is necessary to make twenty-four penetrations of the needlebar within an inch of longitudinal backing fabric advancement. In order to create a $1/12$th gauge square density using an eighth gauge needlebar with an ABC threadup, for the A yarn it is necessary to make fifty-four penetrations of backing fabric over one-inch longitudinal advance. Varying the lateral gauge of stitching is much more readily accomplished utilizing the precision backing shifter described in PCT/US2017/054683 or utilizing a hollow needle tufting machine.

A first technique for implementing varied yarn density is to specify a gauge density for pattern colors 72 in addition to the assigned yarn feed increments. The specified density will generally need to be lower than the sewing gauge density so that a certain number of stitches will need to be removed. Accordingly, if the sewing gauge density is designed to produce $1/12$th gauge square density, and the carpet is desired to only have a $1/10$th gauge square density for a particular pattern color, then instead of leaving 144 yarn bights (12×12) of a particular yarn within a square inch, only 100 (10×10) will be left. In this instance, 44 out of every 144 (or 11 out of 36) possible penetrations of the yarn creating the specified pattern color would not be tufted.

Figure 5:
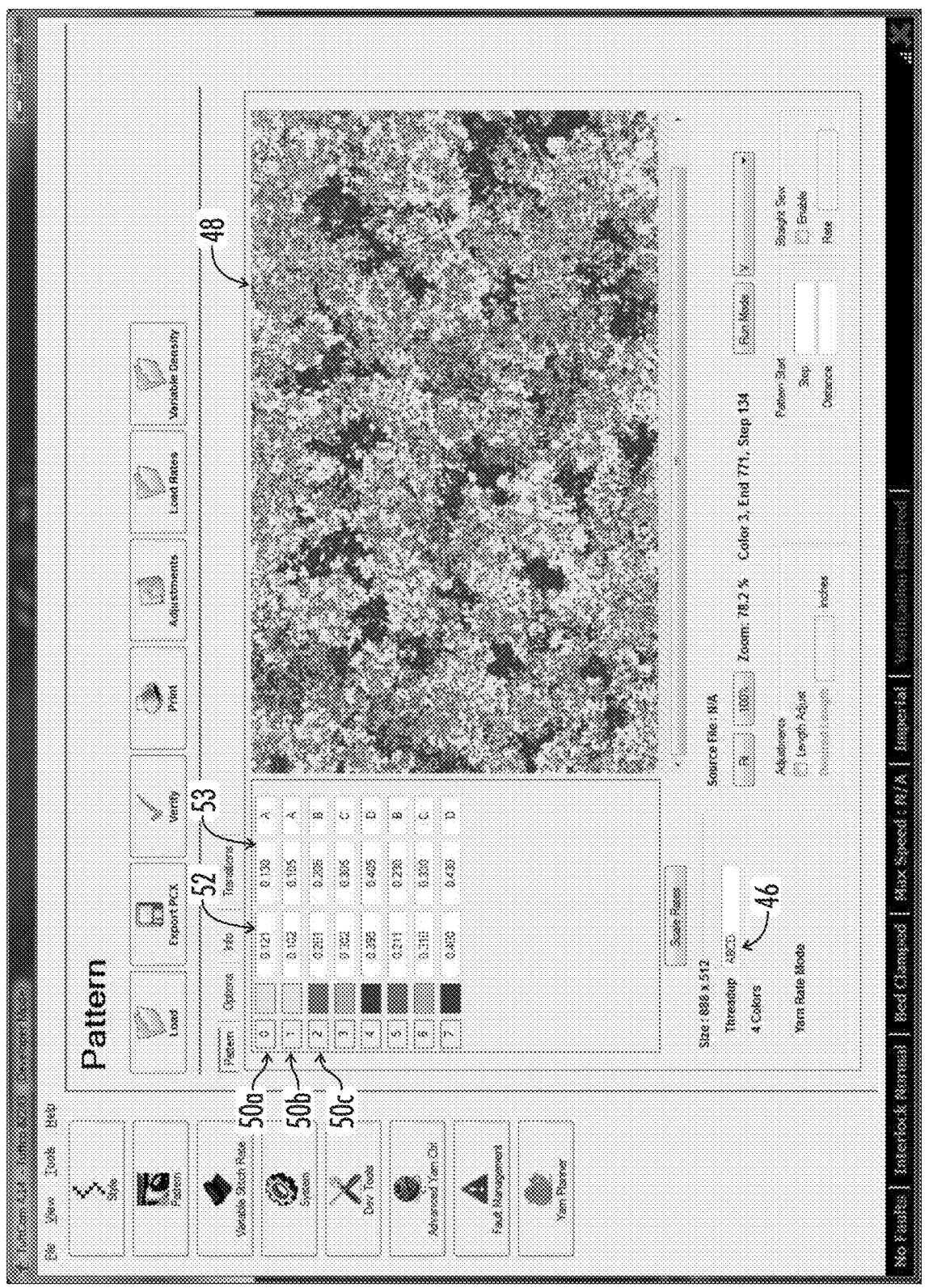
FIG. 5 is an exemplary control screen display for the input of design and tufting parameters, and particularly assigning yarn feed increments to particular yarns associated with the displayed pattern.

For illustrative purposes, a four-color pattern is shown in FIG. 5 with an ABCD threadup 46 is specified. A graphic representation of the pattern to be tufted 48 is shown in the right center of the screen display. While the differences in colors in the represented image 48 indicate different yarns or distinct yarn tufting parameters, the colors do not necessarily correspond to the actual colors of yarns used in the threadup. The A yarns in the illustrated pattern are assigned above the yarn "0" and yarn "1." This means that the same yarn will be tufted in two distinct ways; for instance, it can be seen that the yarn feed rates 52, 53 are greater for the A-yarn "0" 50a relative to the A-yarn "1" 50b. The first B-yarn "2" 50c is specified with an even greater yarn feed increment.

Figure 4:
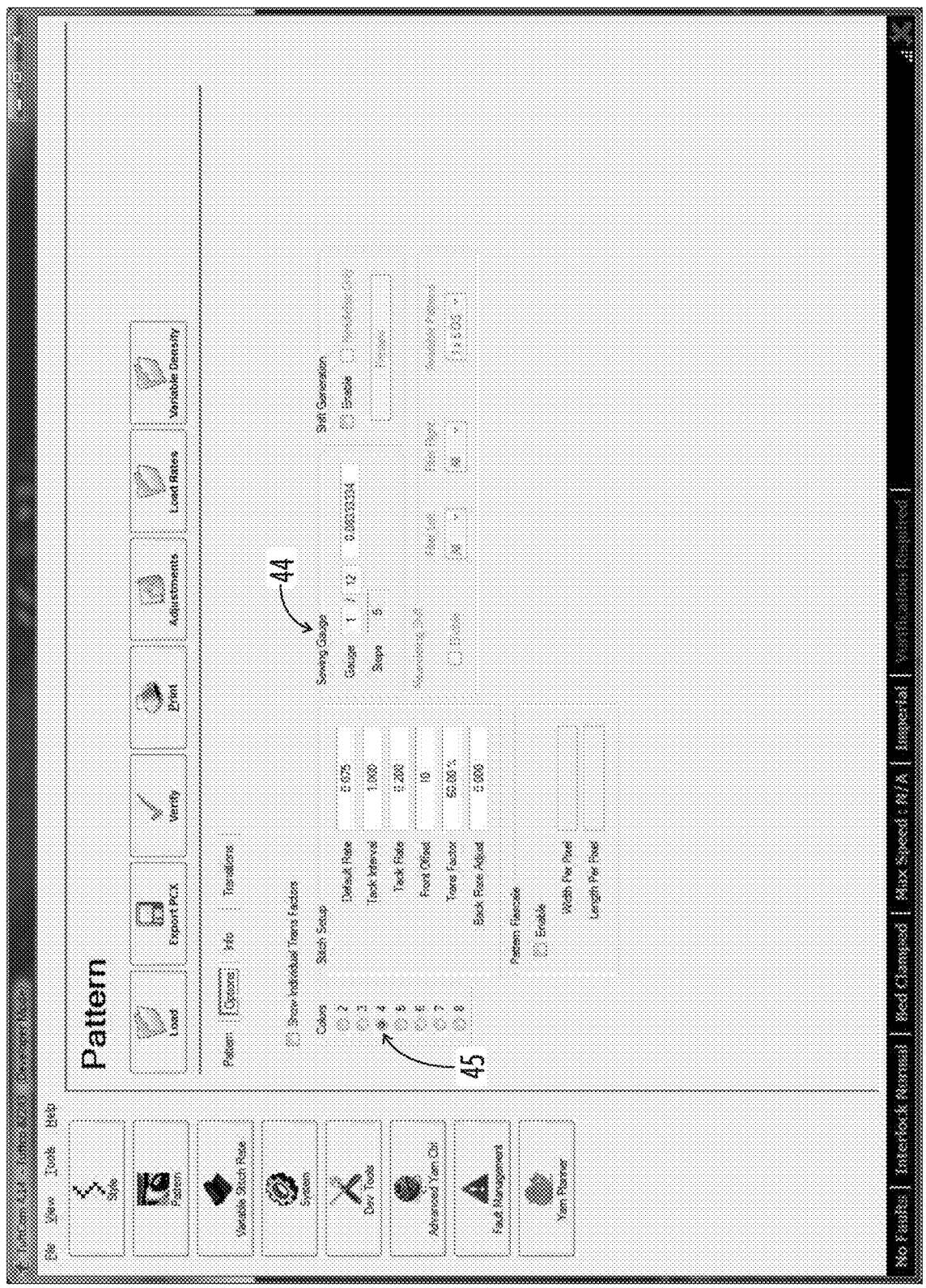
FIG. 4 is an exemplary control screen display for inputting tufting parameters, and particularly the sewing gauge.

Because the illustrated control screen in FIGS. 4 through 9 is designed for a variable gauge tufting machine, a sewing gauge 44 in FIG. 4 is set for a stitch rate that may be utilized to calculate a different number of penetrations depending upon the number of yarns in the threadup and the actual gauge of the needle bar or needle bars used in the tufting machine. FIG. 4 shows that the sewing gauge 44 has been specified for a particular number of colors of yarn in the yarn threadup 45, in the illustrated instance four yarns. The designation of the sewing gauge 44 will generally affect the density of the yarn bights and the weight of the resulting fabric; however, it is subject to further modification as described in the steps 73-77 in FIG. 3.

In some instances, the number of removed stitches when specifying a reduction in density will tend to cause gaps or streaks in the face of the carpet. This might happen if a $1/12$th gauge square density was reduced to a $1/10$th by $1/12$th density so that effectively every sixth stitch was being removed from the yarn bights that would appear on the face of the carpet. In a three-color pattern, this could easily lead to an alignment of the removed stitches and the appearance of lines in the face of the fabric. To prevent gaps, lines or streaks from being apparent when density is changed, after the rate of stitch removal is determined 73, a randomization algorithm is advantageously applied 74. Randomization might be implemented simulating card shuffling, created by pseudo random number generation, or generated in conjunction with simulated random occurrences such as white noise, or even the use of optimized predetermined sequences corresponding to anticipated changes in desired stitch densities. When randomization techniques are utilized, it is also desirable to employ a checking algorithm to ensure that the random removal of stitches did not cluster to leave a visible gap in the face of the carpet. The result of the randomization and bunch protection algorithm, or the specification of a particular sequence for anticipating desired density reductions is the creation of a scattered density map 57 discussed further below.

Figure 6:
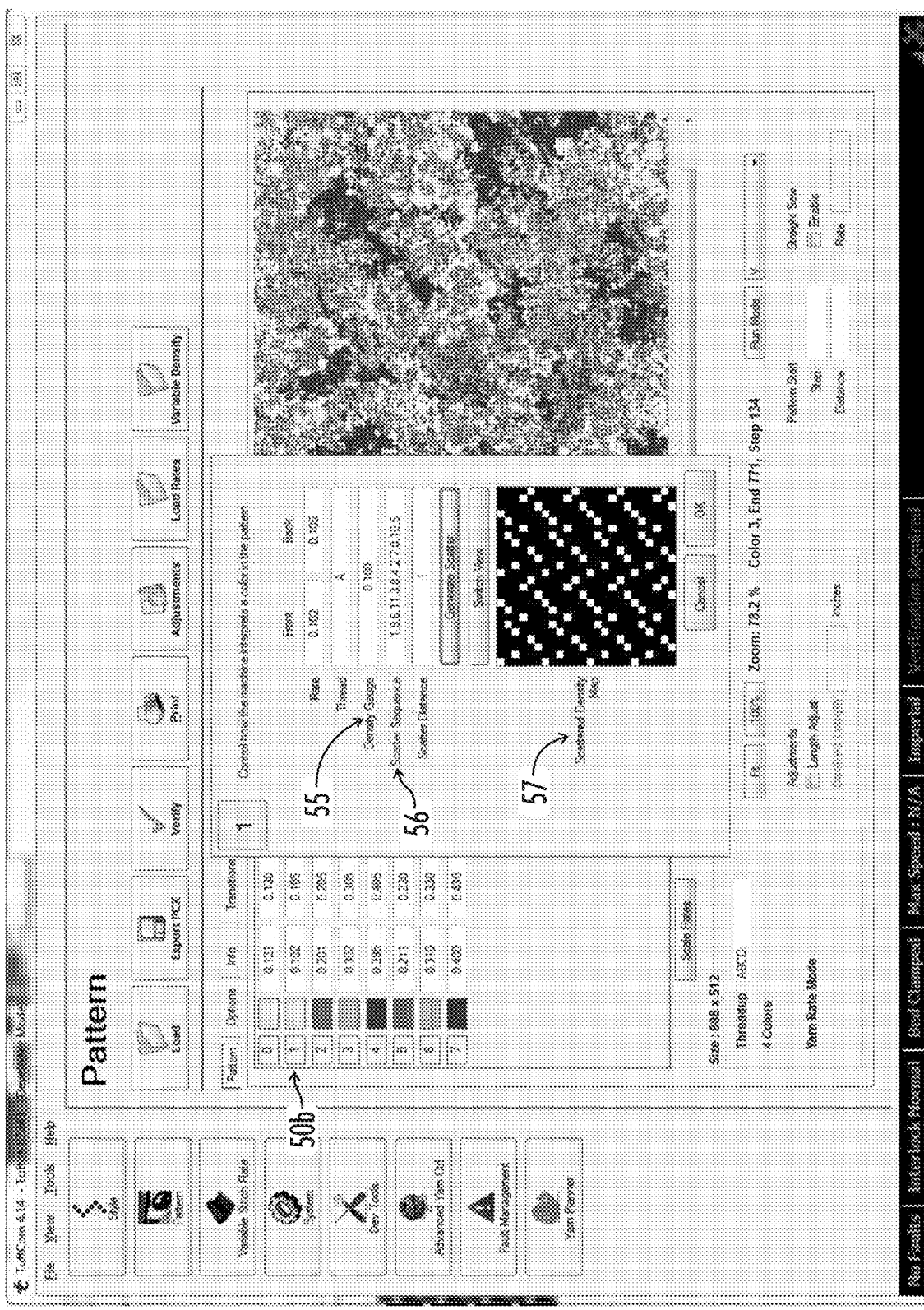
FIG. 6 is an exemplary control screen display for the input of yarn density adjustment for designated yarn 1.
Figure 7:
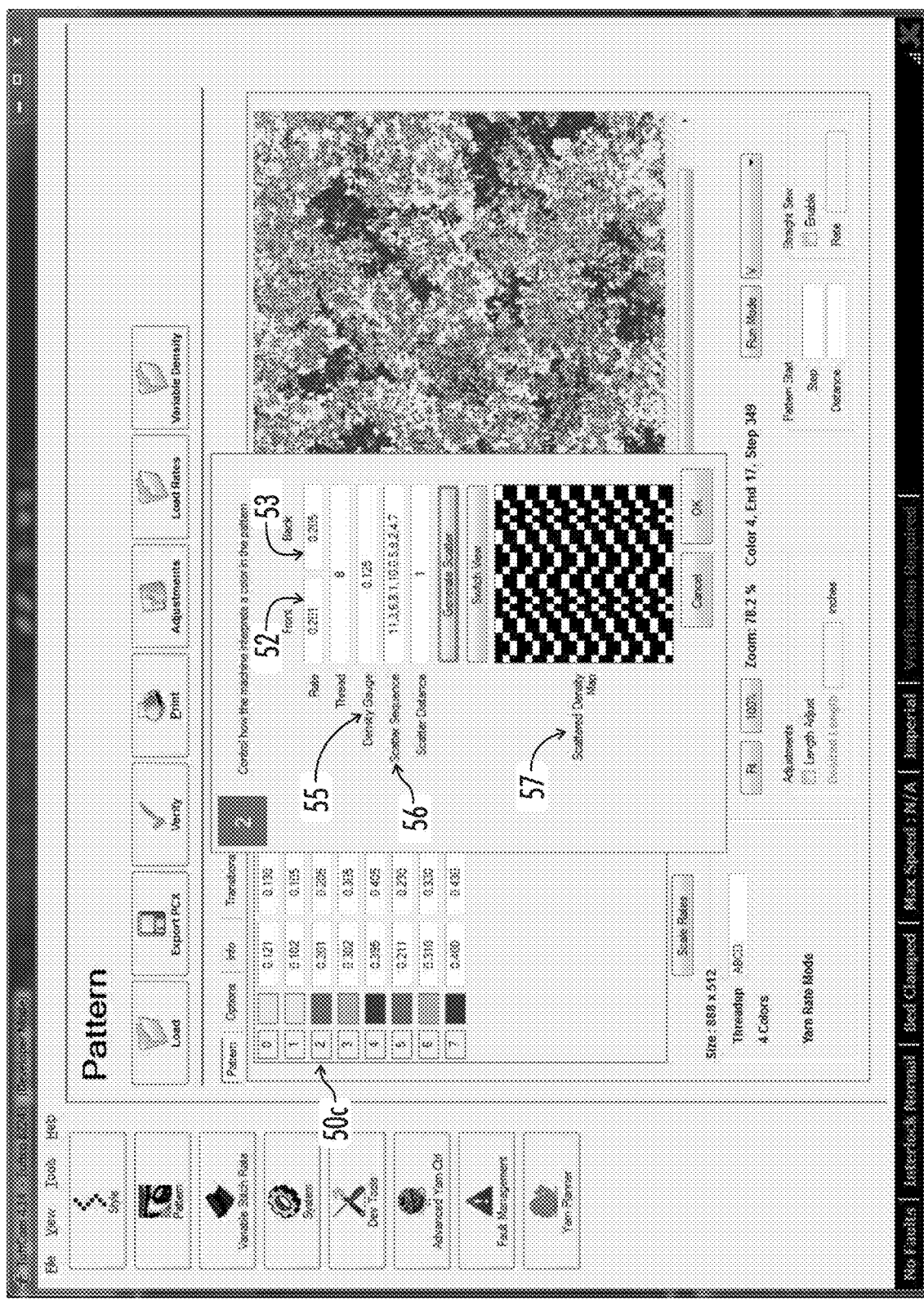
FIG. 7 is an exemplary control screen display for the input of yarn density adjustment for designated yarn 2.
Figure 8:
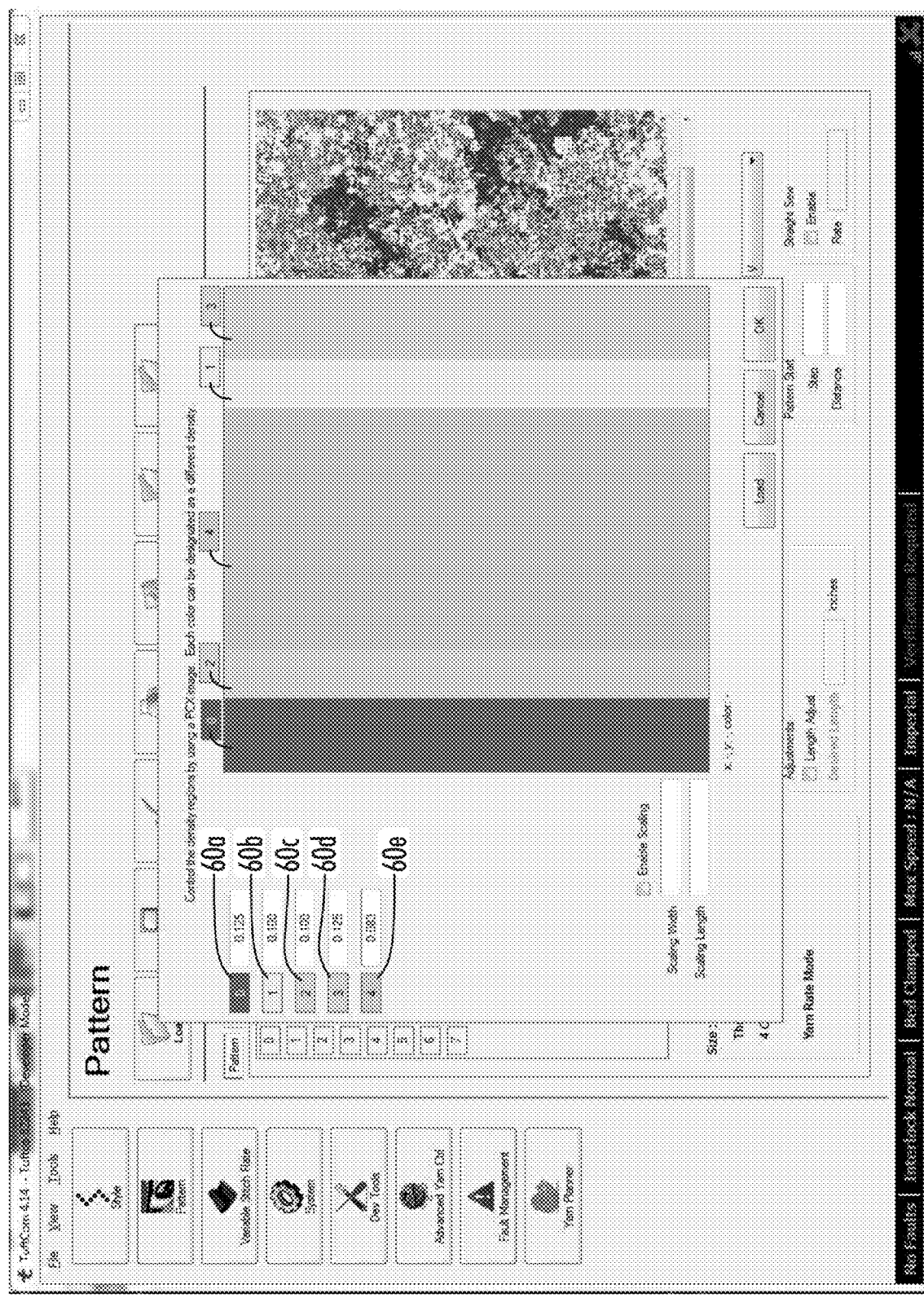
FIG. 8 is an exemplary control screen display illustrating a pattern density overlay.

Turning again to FIGS. 4 and 5, in the absence of any adjustments, all of the yarns in this configuration will be tufted at the specified sewing gauge 44 of $\frac{1}{12}^{th}$ gauge, presumably with 12 stitches per inch. However, FIGS. 6 and 7 show how adjustments can be made to reduce stitch density as contemplated in FIG. 3 at 72-74. FIG. 6 illustrates the density and yarn feed details for yarn "1" 50b which has been assigned a yarn feed rate of 0.102 for tufts on the front needle bar and 0.105 for tufts from the back needle bar on a 2-needlebar configuration on a variable gauge tufting machine. The yarn is also assigned a density gauge 55 and a scatter sequence 56 is utilized to generate a scattered density map 57. Since the sewing gauge for this pattern has been specified at $\frac{1}{12}^{th}$ gauge, the reduction of density for yarn "1" to $\frac{1}{10}^{th}$ gauge means that two stitches from every 12 possible stitches will be removed from the pattern that is tufted. Only the lateral gauge of stitch placement is being adjusted in this instance. The scattered density map shows randomization of those removed stitches. The description of FIG. 11 below describes a randomization method in greater detail.

FIG. 7 shows similar modifications to adjust yarn "2" 50c to a density gauge 55 of ⅛ gauge or 0.125. A scatter sequence 56 is applied to generate a scattered density map 57 which removes four of every 12 stitches to convert the $\frac{1}{12}^{th}$ lateral gauge sewing gauge to $\frac{1}{8}^{th}$ lateral gauge tufting.

In addition to applying density changes on a pattern color by color basis in connection with yarn assignments as shown in FIGS. 6 and 7, it is also possible to utilize pattern overlays. This technique of applying pattern overlays may be utilized either independently or in combination with specifying gauge density for pattern colors. Applying a pattern overlay involves the steps shown in FIG. 3 of determining or selecting a yarn bight removal template for fabric that is not based on color position 76, and applying an algorithm if necessary to adjust the template to sewing gauge 77, and depending upon these steps there may or may not be further randomization and grouping check algorithms applied. For instance, in FIG. 8 a pattern overlay is shown in which the edge portions "0" and "3" 60a, 60d are specified at $\frac{1}{8}^{th}$ lateral gauge while the center portion 60e is specified at $\frac{1}{12}^{th}$ lateral gauge. Intermediate portions 60b, 60c are specified at $\frac{1}{10}^{th}$ lateral gauge. Accordingly, such an overlay might be utilized for a carpet runner that would have relatively denser yarn bights in the central heavily trafficked portion and lighter density toward the edges that would receive less wear.

Figure 9:
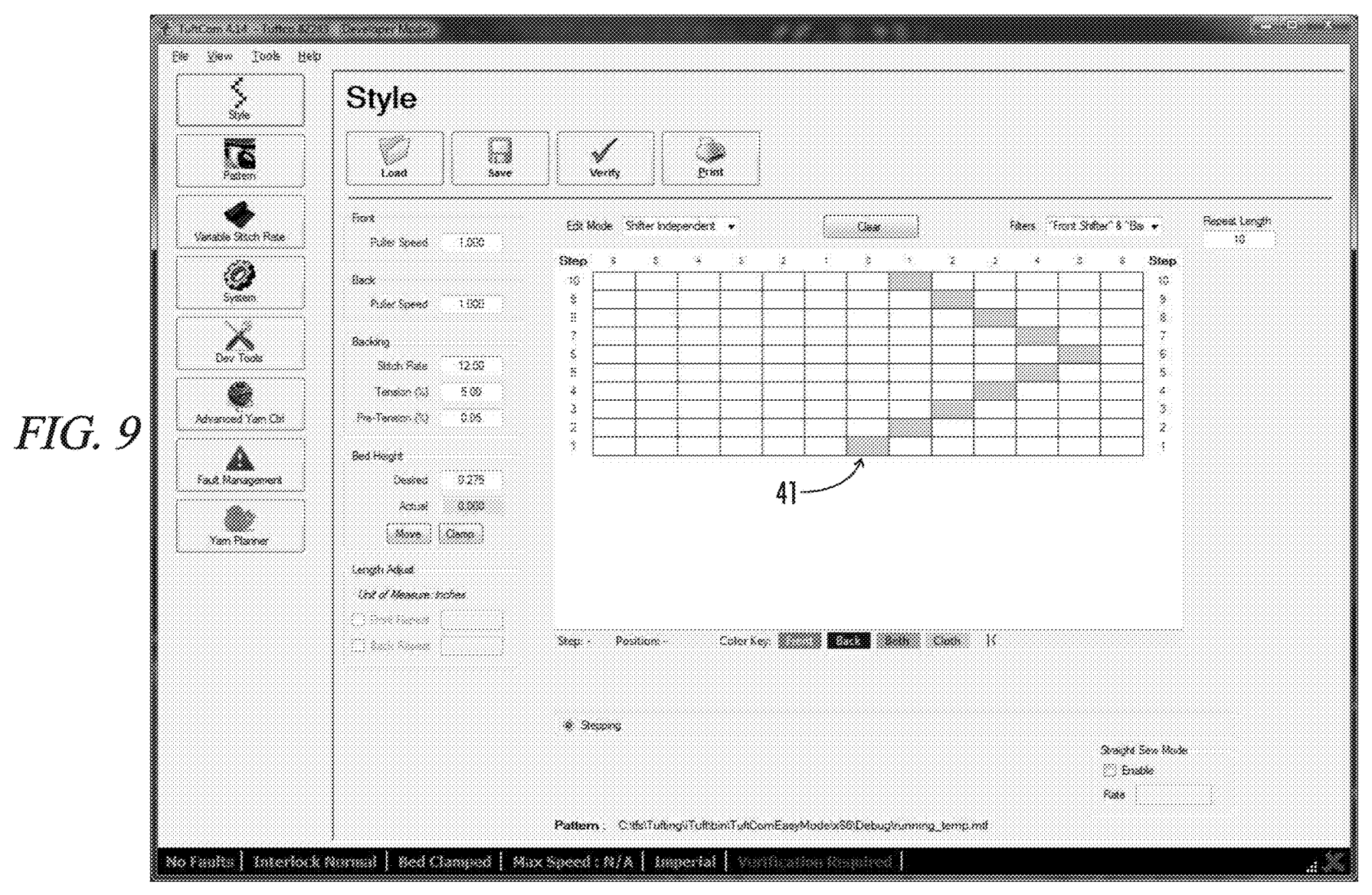

FIG. 9 shows the assignment of a stepping pattern 41, in this case to the cloth feed, although stepping patterns can be assigned to front and back needle bars as well. In the event that a four-color pattern is being tufted, a typical stepping pattern could involve two steps to the right, four steps to the left, and two steps to the right, and many similar variations. Suitable shift profiles for other numbers of colors utilized on a broadloom tufting machine are well known and easily computed. Once the necessary data has been input, the pattern is verified, mapping all the pixel locations from the pattern to the position that best corresponds to a tuft of an appropriate colored yarn and the application of density adjustments by color and by general pattern location overlay. It will be understood that either a pattern overlay or a pattern color density adjustment may be applied or in some instances a combination may be applied. General pattern location overlays are also useful in modifying carpet weight, either alone or in combination with modifications to stitch rates and yarn pile heights.

Figure 10A:
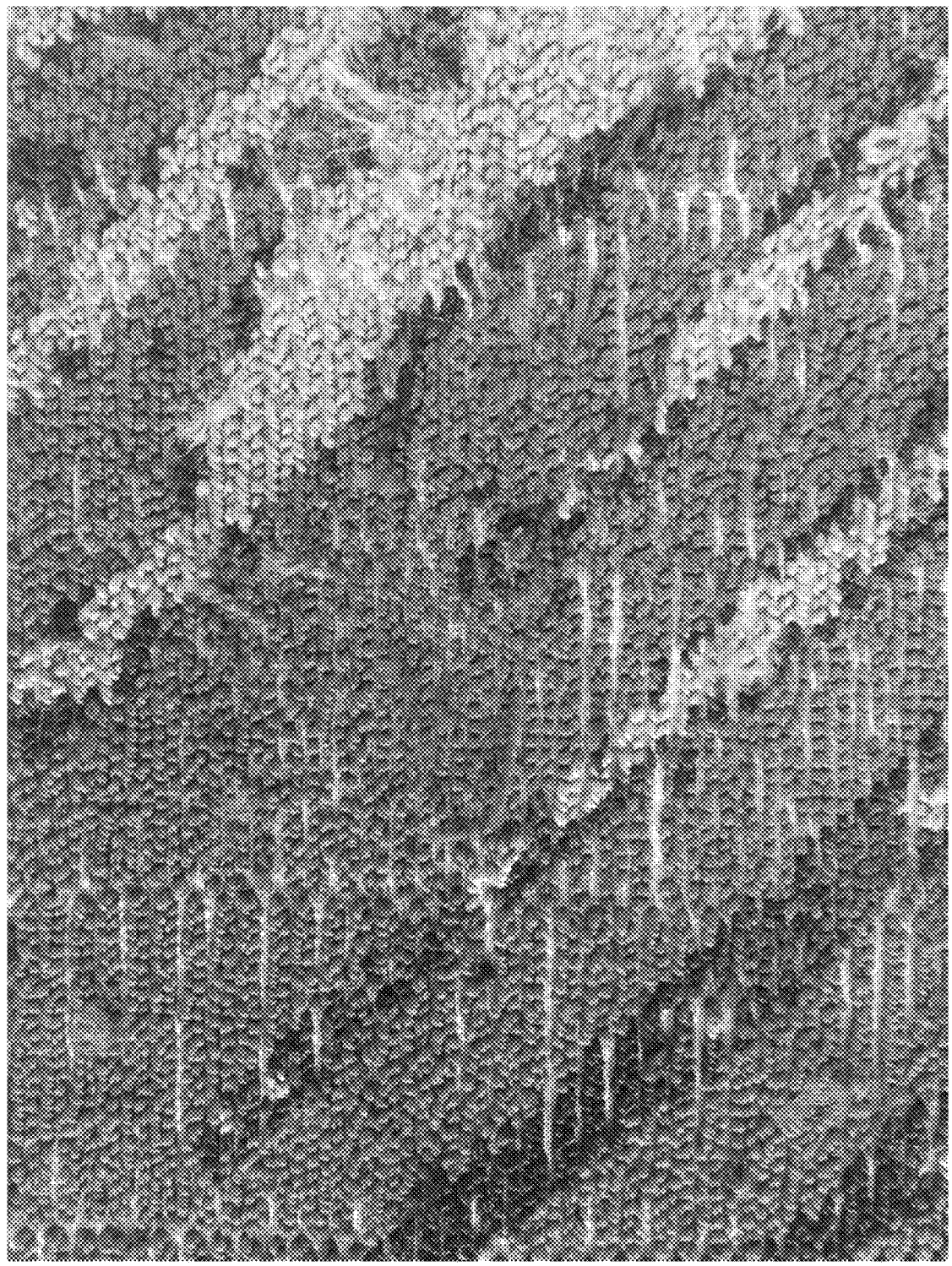
FIGS. 10A through 10C are exemplary backstitch representations of different stitch density adjustments as applied in connection with a hollow needle tufting machine.
Figure 10B:
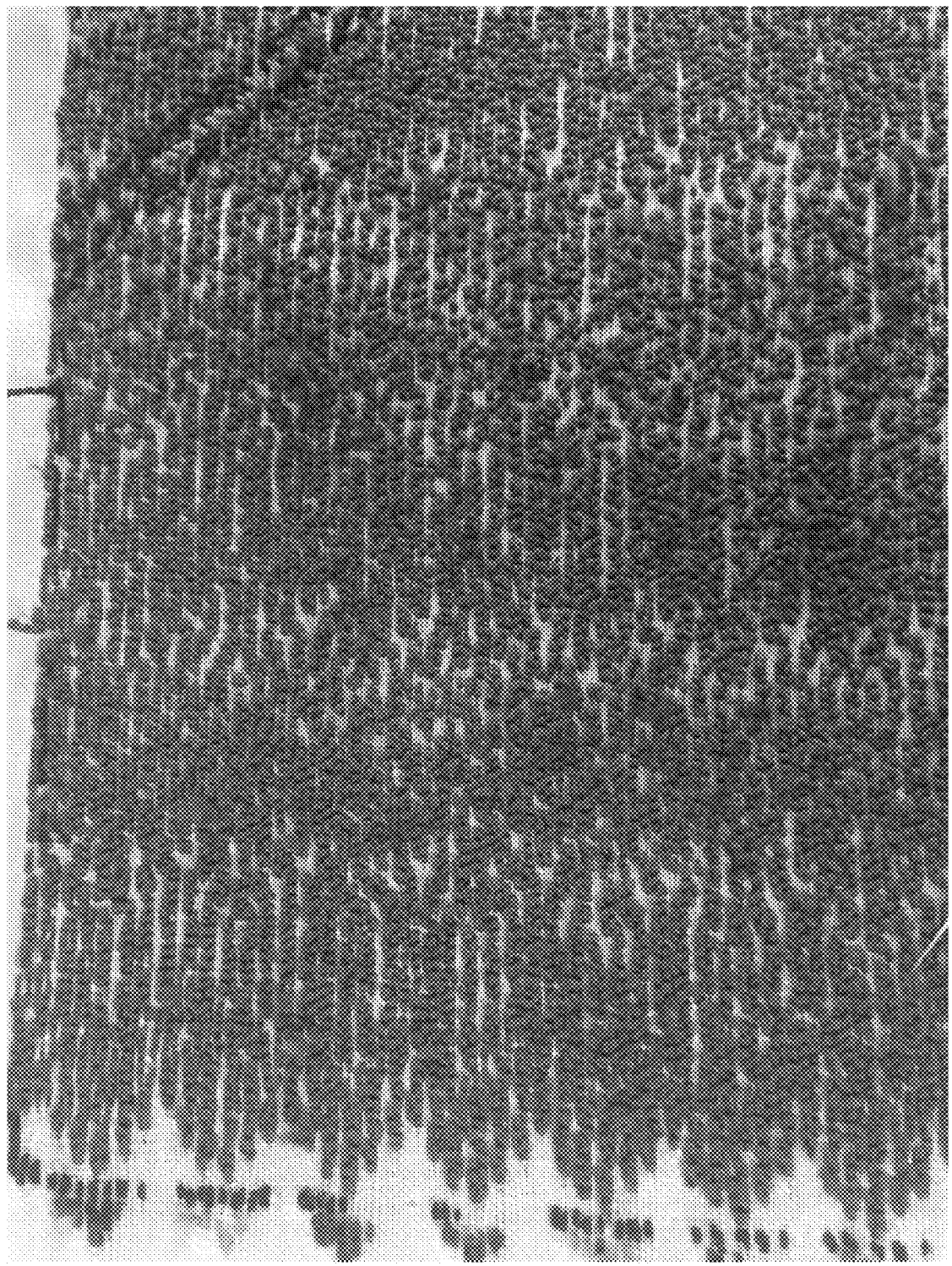
Figure 10C:
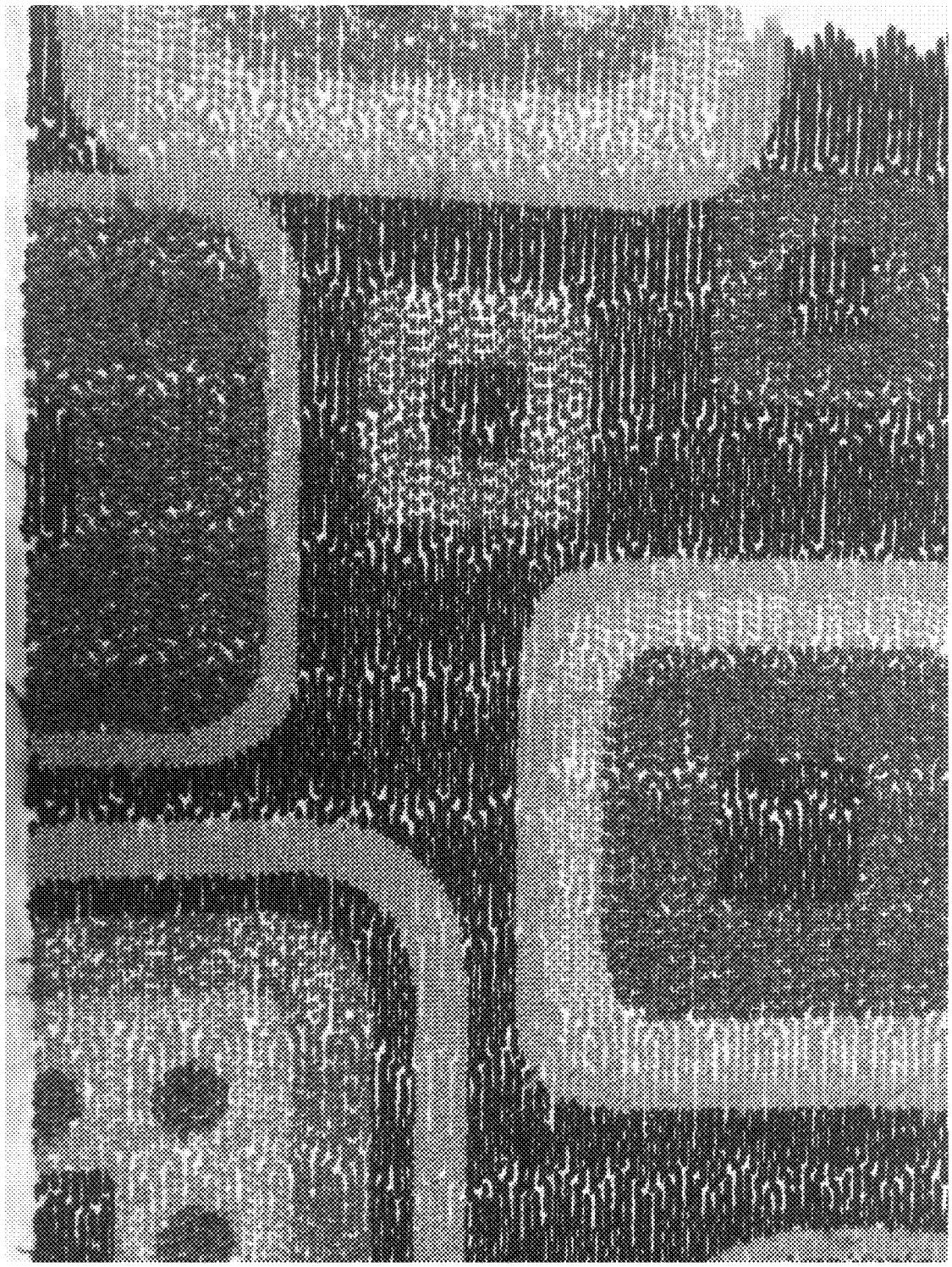

FIGS. 10A through 10C illustrate various backstitch patterns created on a hollow needle (iTron) tufting machine with different stitch density modifications and algorithms applied. FIG. 10A depicts the backstitch of a pattern with no stitch density adjustments. FIGS. 10B and 10C depict the backstitch of the same pattern with stich density reductions to selected colors in the pattern palette using different randomization techniques.

Figure 11A:
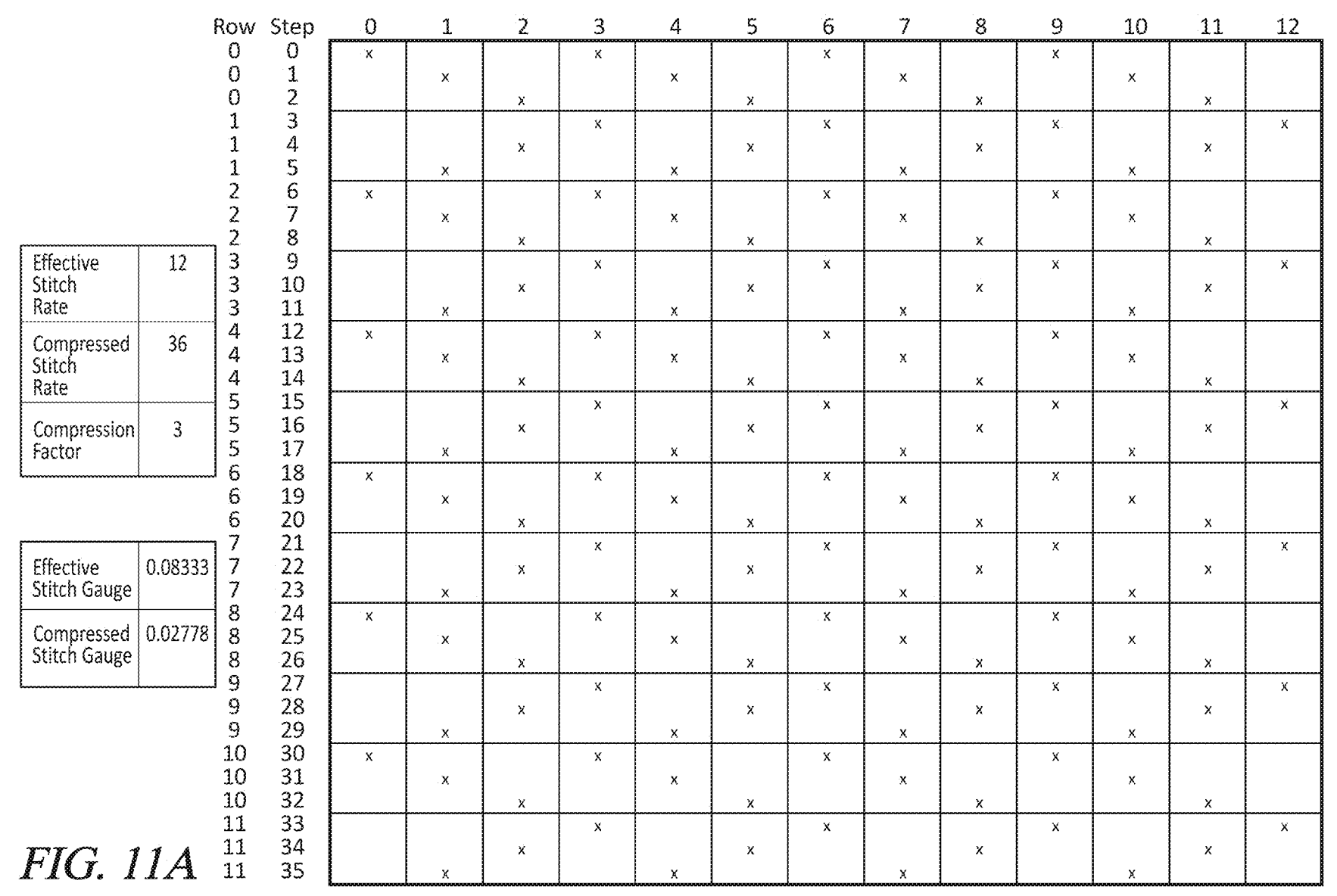
Figure 11B:
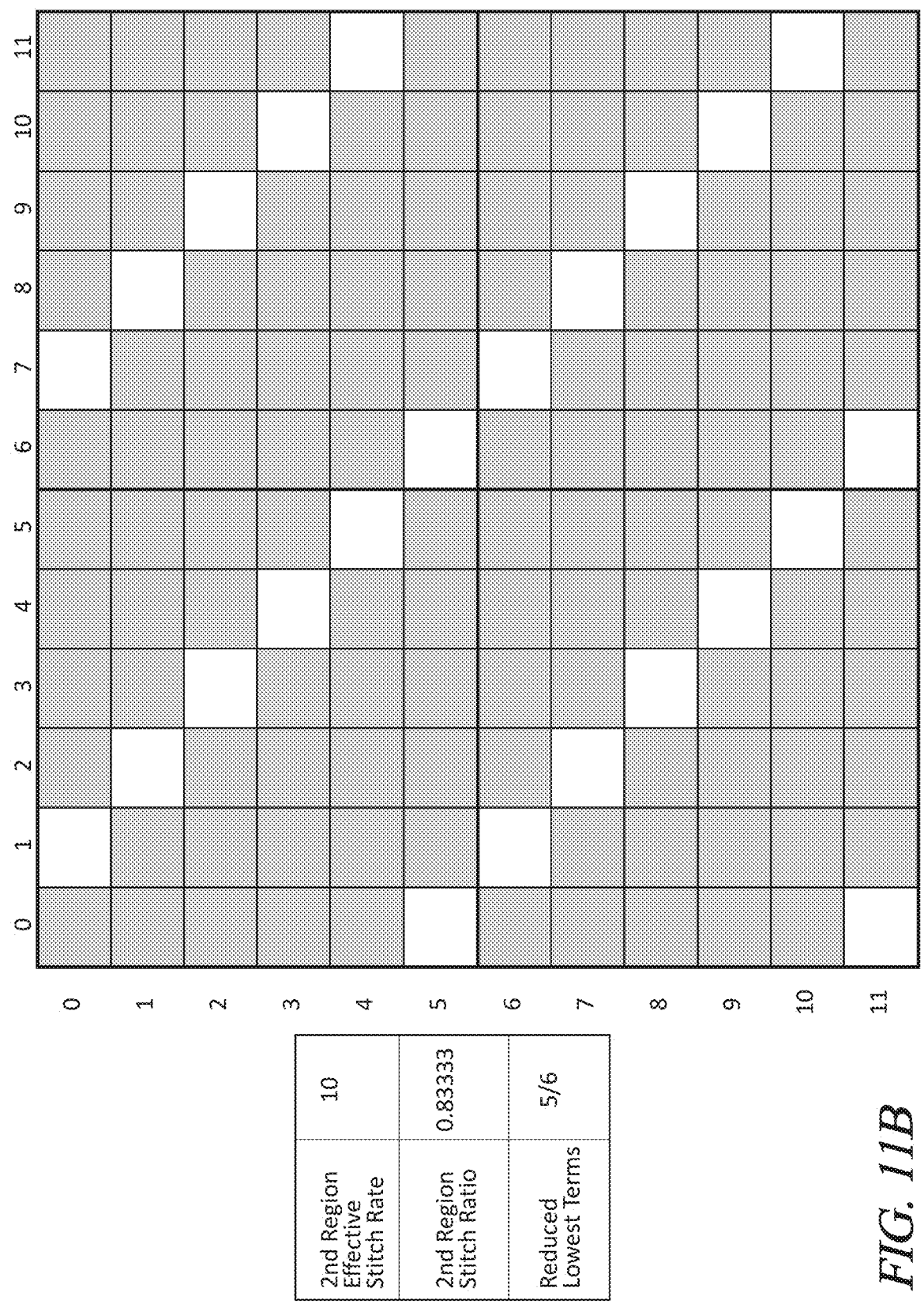

FIGS. 11A through 11D illustrate the computation a stitch density reduction pattern that can be utilized for either a selected pattern palette color or for overall weight reduction of a tufted fabric. The figures show the calculation of stitch density reduction for a $\frac{1}{12}^{th}$ lateral gauge stitch density to a $\frac{1}{10}^{th}$ lateral gauge stitch density, both with an apparent $\frac{1}{12}^{th}$ longitudinal stitch density. In other cases, the longitudinal stitch density may also be advantageously adjusted in addition to the lateral gauge stitch density. FIG. 11A shows the penetration points "X" for one of three yarns in an ABC $\frac{1}{12}^{th}$ gauge needlebar. Since there are three colors, it takes three steps to complete a single row of stitches. On the left-hand margin, "Step" is the penetration the needlebar is on longitudinally in connection with a row of stitches. So, the first time the needles penetrate the backing for the next row of stitches, the backing step is set to "0", for the next penetration "step" is set to "1", and for the third penetration on the row, "step" is set to "2".

Figure 11C:
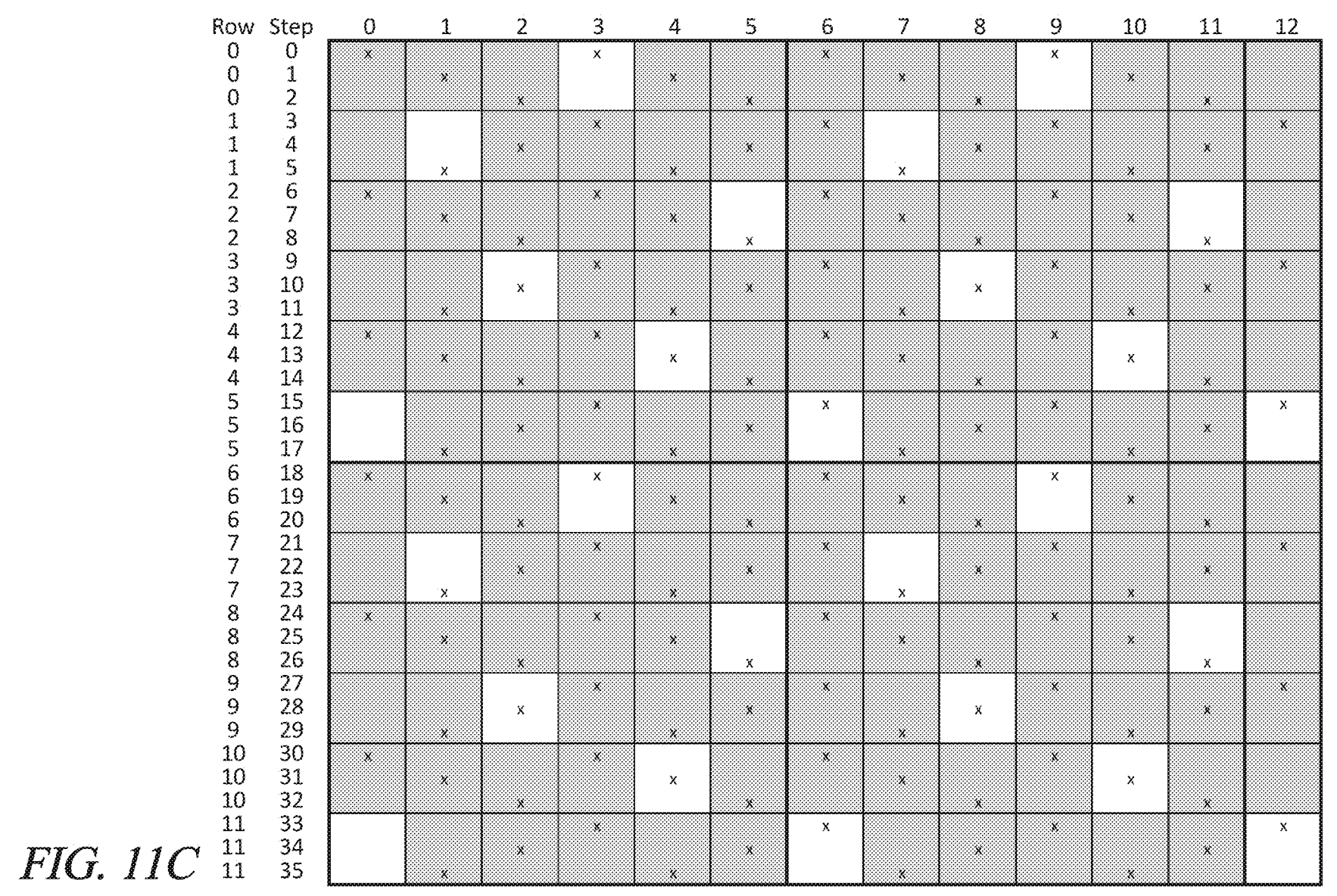
Figure 11D:
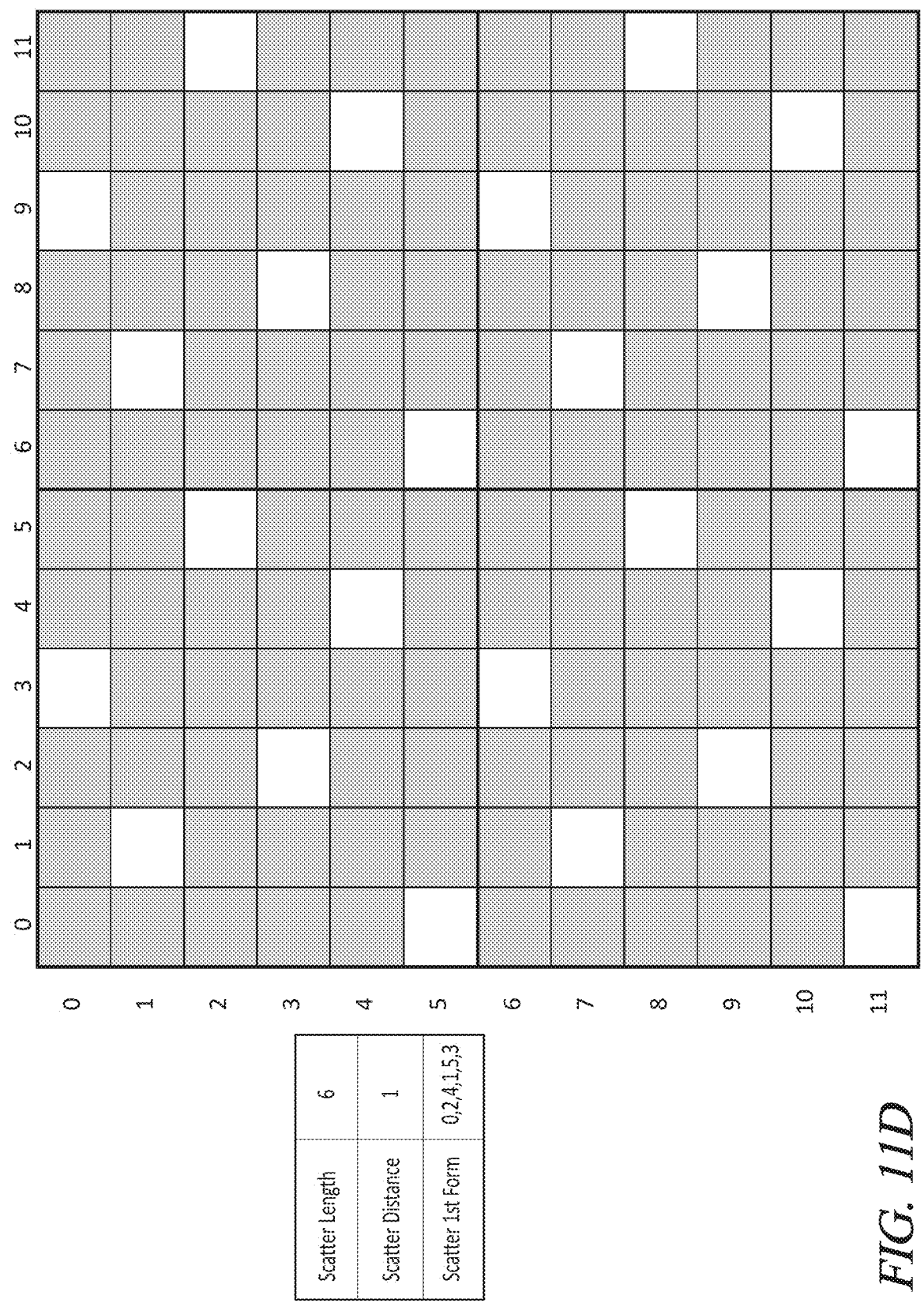

FIG. 11B shows the removal of every sixth stitch in a regular removal grid, indicating that when an "X" appears in a white square as reflected in FIG. 11C, no yarn bight will be tufted on the face of the fabric. FIG. 11D is captioned to reflect that the randomization involves creating the grid of FIG. 11B and then shuffling the columns 0-5 to instead be displayed in the order of columns 0, 2, 4, 1, 5, 3. In FIG. 10C, the first column of the regular removal grid was assigned to every needle, and each step just kept repeating over that same column. This means that only the first column of the density map was used, and the scattered variations are not incorporated. In FIG. 11B, the scatter grid starts each needle on column 0, but as a needle finishes the end of a column the next penetration starts over at the beginning of the next column to the right. With the selection of an appropriate predetermined sequence for randomization for the desired density adjustment, in light of the particular tufting machine configuration and pattern characteristics, the application of a bunch checking algorithm may not be necessary to insure a relatively uniform visual appearance of the tufted fabric.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

What is claimed is:

1. In a tufting machine of a type having a row of reciprocating needles inserting a plurality of different yarns through a backing fabric moving longitudinally through the machine, where the backing fabric and needles are laterally shiftable relative to each other, a method for varying the stitch density in the manufacture of tufted patterns from pixel mapped designs comprising the steps of:
   creating a pixel-mapped design for tufting comprising a plurality of pattern colors;
   establishing a sewing gauge and a corresponding sewing gauge density for the tufting machine to employ with the design;
   threading the tufting machine with at least a first yarn and a second different yarn in desired positions;
   designating the different yarns to at least one pattern color;
   assigning yarn feed increments to the pattern colors;
   specifying a density less than the sewing gauge density for at least one pattern color;
   setting a shift pattern for at least one of the row of needles or the backing fabric;
   processing the pattern data in view of the machine sewing gauge, shift pattern, yarn feed increments, and yarn positions to create pixel mapped pattern design information;
   translating the pixel mapped pattern design information into tufting machine instructions; and
   operating the tufting machine to create tufted fabric having at least a first yarn with a lateral stitch density lower than the density of the sewing gauge of the tufting machine and a second yarn.

2. The method of claim 1 wherein the different yarns have different deniers.

3. The method of claim 1 wherein the different yarns have different colors.

4. The method of claim 1 wherein a pattern is determined for omission or removal of stitches of the at least one yarn with a specified lateral density less than the sewing gauge density.

5. The method of claim 4 wherein the pattern determined for omission or removal of stitches of the at least one yarn is randomized by an algorithm.

6. The method of claim 5 wherein a bunch checking algorithm is applied to the stitches selected for omission or removal to insure those selected stiches are not so clustered as to visually impair the tufted fabric.

7. The method of claim 4 further comprising adjusting the longitudinal stitch density.

8. The method of claim 4 wherein a scatter sequence is used to generate a scattered density map for selection of stitches for omission or removal.

9. In a tufting machine of a type having a row of reciprocating needles inserting a plurality of yarns through a backing fabric moving longitudinally through the machine, where the backing fabric and needles are laterally shiftable relative to each other, a method for varying the stitch density in the manufacture of tufted patterns from pixel mapped designs having a plurality of pattern colors comprising the steps of:
   creating a pixel-mapped design of stitch placements for tufting;
   establishing a sewing gauge having a density for the tufting machine to employ with the design;
   threading the tufting machine with a yarns in desired positions;
   assigning yarn feed increments to the pattern colors;
   applying a pattern overlay designating stitches for removal or omission;
   setting a shift pattern for at least one of the row of needles or the backing fabric;
   processing the pattern data in view of the machine sewing gauge, shift pattern, yarn feed increments, pattern overlay, and yarn positions to create pixel mapped pattern design information;
   translating the pixel mapped pattern design information into tufting machine instructions; and
   operating the tufting machine to create tufted fabric having at least an area with a lateral stitch density lower than the density of the sewing gauge of the tufting machine.

10. The method of claim 9 wherein the tufting machine is threaded with a plurality of different yarns and further comprising designating different yarns to at least one pattern color.

11. The method of claim 10 wherein the different yarns have different deniers.

12. The method of claim 10 wherein the different yarns have different colors.

13. The method of claim 10 wherein a pattern is determined for omission or removal of stitches of the at least one yarn with a specified lateral density less than the density of the sewing gauge.

14. The method of claim 13 wherein the pattern determined for omission or removal of stitches of the at least one yarn is randomized by an algorithm.

15. The method of claim 13 further comprising adjusting the longitudinal stitch density.

16. The method of claim 13 wherein a scatter sequence is used to generate a scattered density map for selection of stitches for omission or removal.

17. The method of claim 14 wherein a bunch checking algorithm is applied to the stitches selected for omission or removal to insure those selected stiches are not so clustered as to visually impair the tufted fabric.

* * * * *